United States Patent [19]

Rowe

[11] 4,201,413
[45] May 6, 1980

[54] LIFT APPARATUS FOR CAMPER TOP

[76] Inventor: David E. Rowe, 9849 Yarrow Ct., Broomfield, Colo. 80020

[21] Appl. No.: 922,593

[22] Filed: Jul. 7, 1978

[51] Int. Cl.² .............................................. B60P 3/32
[52] U.S. Cl. ..................................... 296/165; 296/176
[58] Field of Search ............. 296/23 R, 23 C, 23 MC, 296/26, 27, 99 R, 100, 165, 172, 173, 176

[56] References Cited

U.S. PATENT DOCUMENTS

| | | | |
|---|---|---|---|
| 3,212,813 | 10/1965 | Peterson | 296/23 C |
| 3,288,520 | 11/1966 | Krutzikowsky | 296/23 R |
| 3,363,932 | 1/1968 | Mann | 296/23 R |
| 3,420,567 | 1/1969 | Christensen | 296/27 |
| 3,437,372 | 4/1969 | McGarry | 296/23 R |
| 3,583,755 | 6/1971 | Hedrick | 296/23 R |
| 3,675,885 | 7/1972 | Shute | 296/23 R |
| 4,054,011 | 10/1977 | Ensink | 296/26 |

Primary Examiner—John J. Love
Assistant Examiner—John A. Carroll
Attorney, Agent, or Firm—Young & Martin

[57] ABSTRACT

An improvement in folding apparatus for expandable top camper bodies includes lifting and supporting apparatus for the top of the camper positioned at the front and rear of the camper body, each of which has a bi-fold panel comprised of two foldable panel sections hinged to each other and to the lateral wall of the camper and the top of the camper. The hinges are spring-loaded to self actuate and push the top upwardly to its expanded position and retain it in that position. The invention also includes resilient side stays having pre-formed crimps to induce folding for guiding the flexible fabric siding of the camper during folding to keep it away from the closure edge between the top and side panels of the camper and to keep it from wrinkling.

2 Claims, 12 Drawing Figures

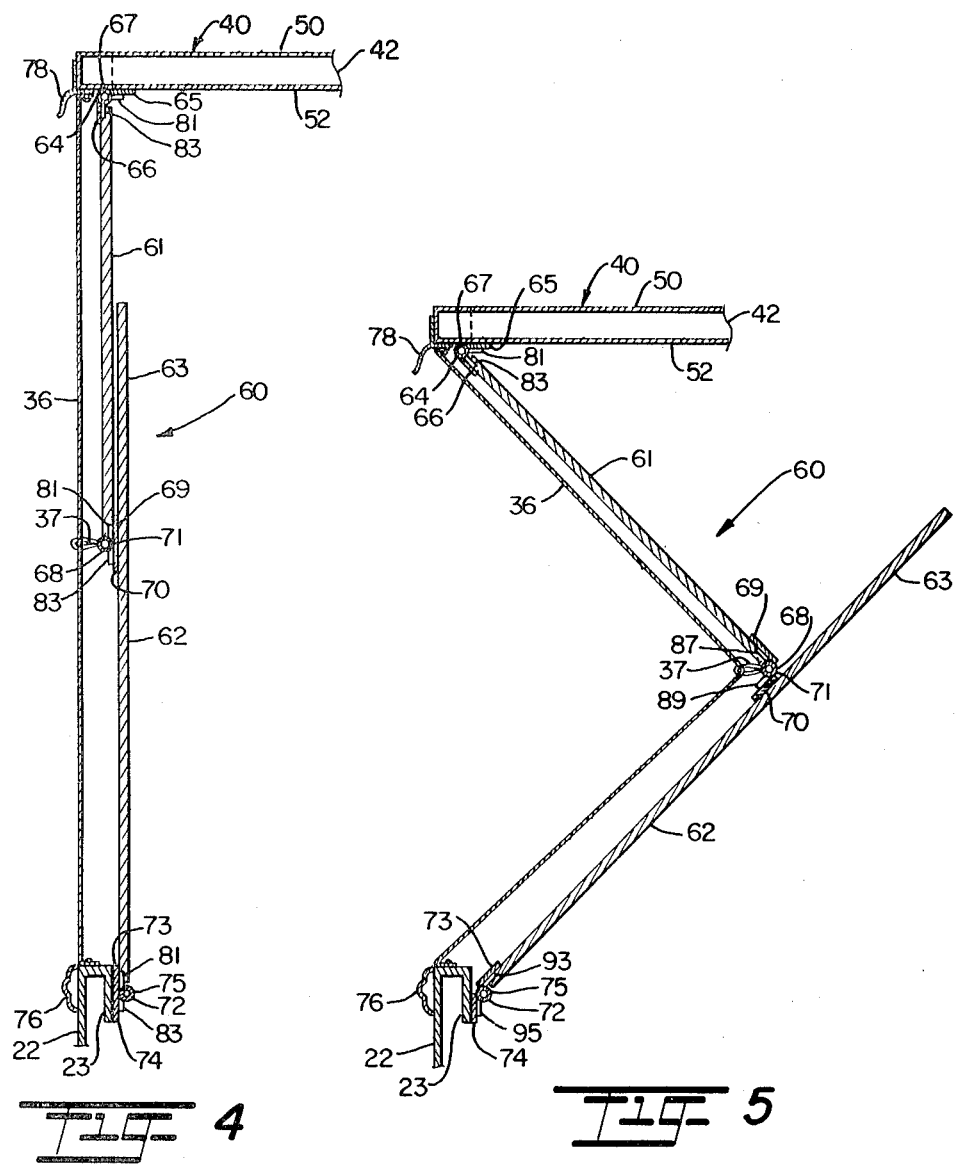
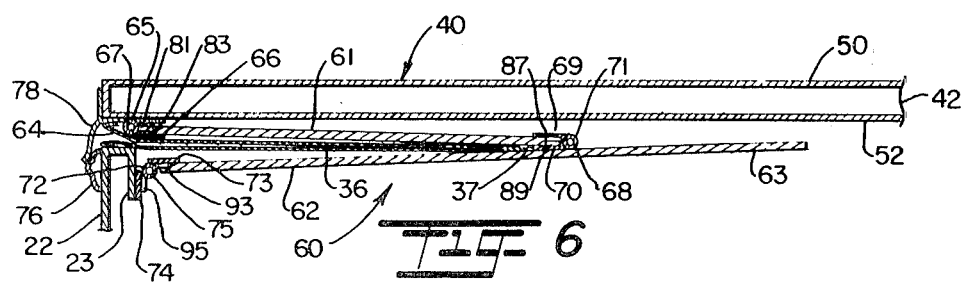

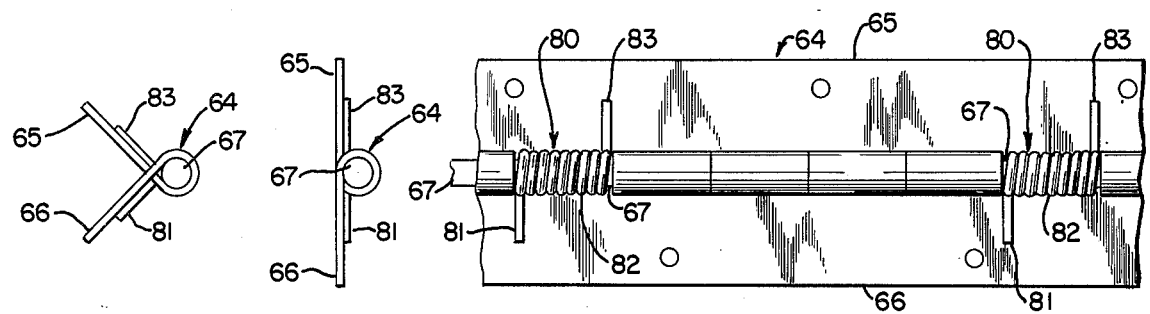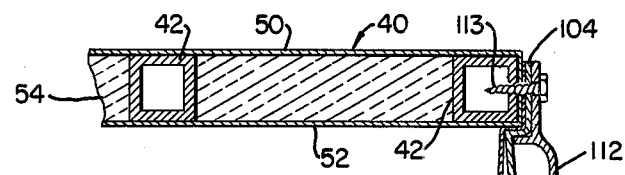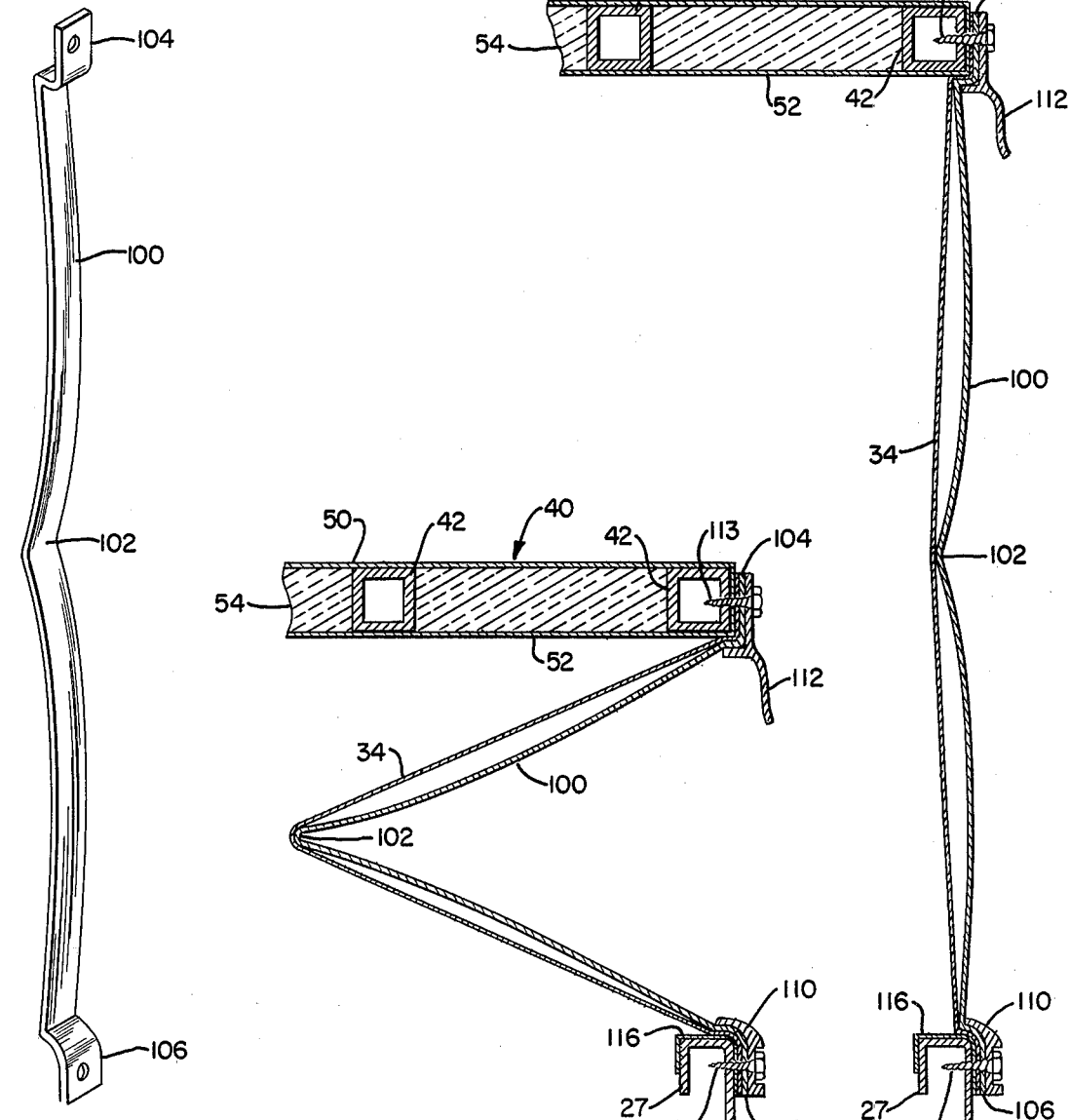

LIFT APPARATUS FOR CAMPER TOP

BACKGROUND OF THE INVENTION

The present invention relates generally to hinged folding mechanisms, and more specifically to hinged folding apparatus for attaching, lifting, supporting and unfolding an expandable top on a camper body.

Recreational camping vehicles in a variety of designs and forms are used widely by persons who desire convenient yet mobile camping facilities. Such vehicles include camper trailers, vans, and camper bodies mounted in pick-up truck boxes as well as camper bodies integrally attached to popular four-wheel drive vehicles. Since sufficient head room is required to accommodate persons standing in the camper bodies as well as to provide sufficient usable open space in the interior of the camper body, conventional camper bodies are relatively high and extend a considerable distance above the body of the vehicle on which they are mounted or by which they are being towed. This necessary height causes undesirable bulkiness, and even more significant, undesirable wind resistance while traveling at high speeds.

To overcome some of these problems during transportation, while providing the necessary height of the interior ceiling while in use for camping, camper bodies with expandable tops have been developed and are becoming more popular. Such camper bodies usually include a floor and lower portions of front, rear and side walls which are solid and substantially resemble conventional camper bodies. However, the height of the walls usually approximates the height of the vehicle on which the camper body is mounted. A top or roof panel is positioned over the walls. Front, rear and sidewall extensions are then provided by sheets of flexible fabric attached to the top of the solid wall sections and to the underside of the roof structure. A foldable support structure is then provided to support the roof panel a spaced distance above the solid wall sections for camping use and to allow the roof panel to be folded downwardly to rest directly on the top of the wall panels for transportation.

Such expandable tops are quite successful in solving the problem of excess wind resistance and bulkiness during transportation while providing sufficient head room in the interior of the camper as it is being used for camping. However, the foldable support structures and associated facilities for supporting the roof panel in a safe, stable manner, yet which can be easily operated with a minimum of time and effort to move the roof from the transportation position to its expanded position and refolding it again, have not been entirely satisfactory. Some of such folding mechanisms are somewhat unstable during the folding process, and time consuming measures and efforts must be made to keep the flexible fabric neatly folded out of the way to avoid wrinkling and pinching between the top and the upper wall sections, which if not avoided would ultimately result in tears and holes worn through the fabric thus impairing its effectiveness as a shelter. Bifold panels, particularly unbiased panels, have been in use in the public domain for foldably supporting roofs on camper bodies, however, it has been found that improvements are desirable to increase their utility and effectiveness for such use.

SUMMARY OF THE INVENTION

Accordingly, it is an object of the present invention to provide a foldable support mechanism for the roof panel of an expandable camper body which is stable throughout all phases of its operation, and which is self actuating to lift the roof panel and to maintain it in its expanded position over the solid wall portions of the camper body.

Another object of the present invention is to provide folding stays for guiding the flexible fabric as it is being folded while the top panel is being collapsed for transportation.

Still another object of the present invention is to provide a convenient, safe, stable and easily operable folding and support mechanism for expandable tops of camper bodies which are durable, dependable, and relatively inexpensive to manufacture and install.

The folding support mechanism of the present invention includes two biased bifold panels, one at the front of the camper body and the other at the rear of the camper body. Each bifold panel includes two sections, the lower of which is hinged to the top of the solid wall portion and the upper of which is hinged to the underside of the roof panel. Both sections are hinged together in a manner such that they are capable of folding towards and onto each other. The hinges are spring-loaded to bias the panel sections away from each other and into extended position for biasing the top to its expanded position over the solid portion of the camper body.

The invention also includes resilient, elongated stays having pre-formed crimps along the side of the camper adjacent the flexible fabric portions of the side panels for guiding the flexible fabric in a neat, unwrinkled manner into folded position and for keeping the fabric away from the joint between the top of the solid wall portion and the undersurface of the roof panel when the roof panel is drawn into and attached in its collapsed position on the top edges of the solid wall portion.

BRIEF DESCRIPTION OF THE DRAWINGS

Other objects, advantages and capabilities of the present invention will become more apparent as the description proceeds taken in conjunction with the accompanying drawings, in which:

FIG. 4 is a sectional view taken along lines 4—4 of FIG. 3;

FIG. 5 is a sectional view similar to FIG. 4 in a partially collapsed position;

FIG. 6 is a sectional view of the mechanism shown in FIGS. 4 and 5 in the totally collapsed position;

FIG. 7 is an enlarged, fragmentary view of a typical spring-loaded hinge in the foldable support mechanism of the present invention;

FIG. 8 is a side elevation view of the hinge in FIG. 7;

FIG. 9 is a side elevation view of the hinge in FIG. 7 in partially folded position;

FIG. 10 is a perspective view of the guide stay of the present invention.

FIG. 11 is a sectional view of the guide stay as properly positioned between the roof panel and solid side panels of the camper top in expanded position taken along lines 11—11 in FIG. 1; and FIG. 12 is a sectional view of the guide stay of FIG. 11 in partially folded position.

DETAILED DESCRIPTION OF THE PREFERRED EMBODIMENT

Figure 1:
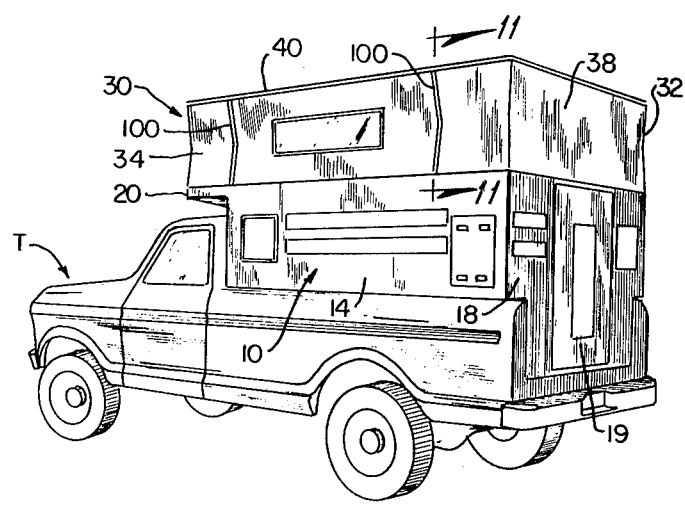
FIG. 1 is a perspective view of a camper body mounted in the box of a pick-up truck, the top of the camper body being expanded in its used position.
Figure 2:
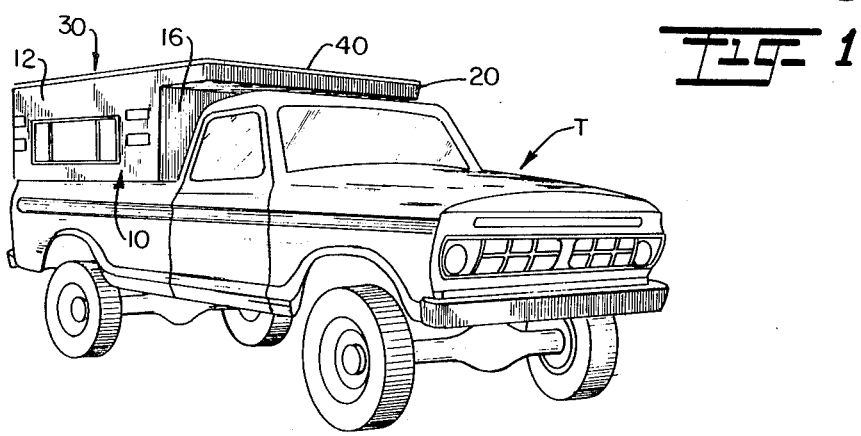
FIG. 2 is a perspective view of a camper body collapsed into its transportation position.

A camper body 10 having a pop-up top 30 with lifting and folding apparatus formed in accordance with the present invention is shown in FIG. 1 with the top 30 expanded to its use position and in FIG. 2 with the top 30 collapsed or folded to its storage position for non-use and for transportation. The front torsioned bifold lift panel assembly 60 formed in accordance with the present invention is shown in FIG. 3.

Figure 3:
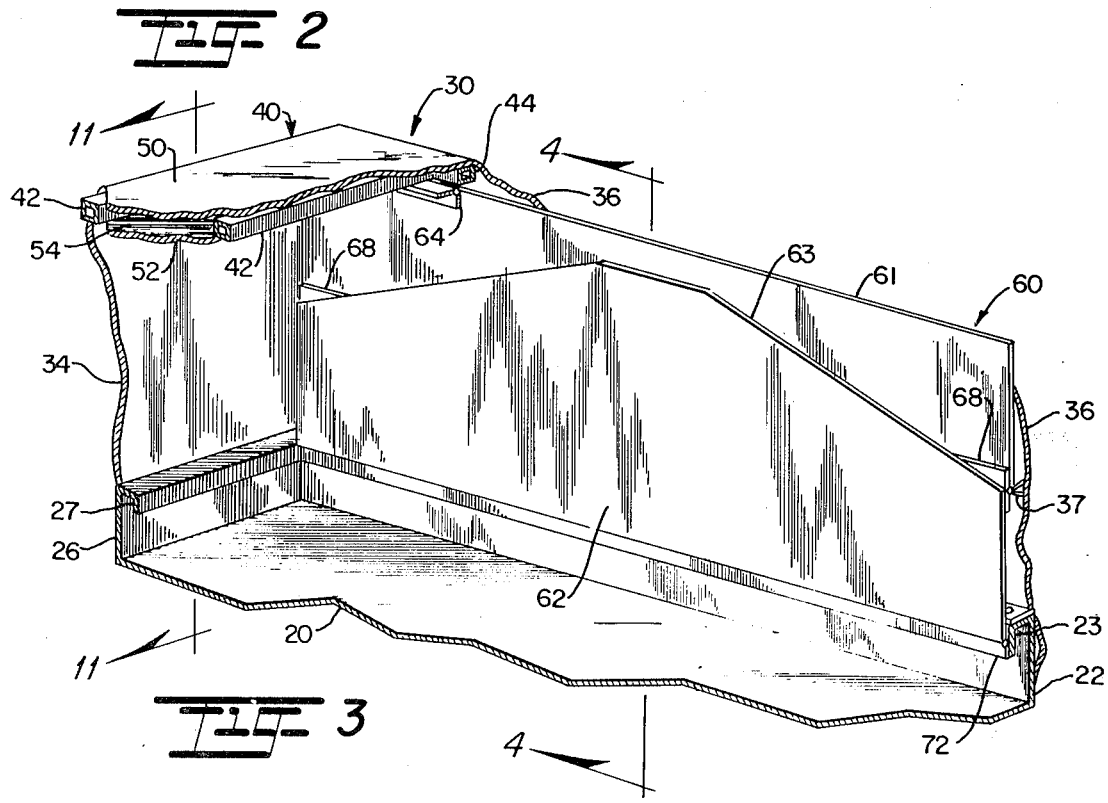
FIG. 3 is an enlarged, cutaway perspective view of the folding support mechanism of the present invention for the roof panel of a camper body.

In referring to FIGS. 1 through 3, the camper body 10 includes solid lower wall sections to form the rigid structure and shell of the camper body, including right side panel 12, left side panel 14, front panel 16, and rear panel 18. A door 19 is illustrated in this drawing in the rear panel 18; however, in camper bodies mounted directly on the chassis of a vehicle rather than in the box of a pick-up truck, the door can be located in a side panel as well as in a rear panel. The particular camper body illustrated also includes a cantilevered portion 20 extending forwardly from the front wall 16 over the top of the pick-up cab to increase the usable space in the camper. It should also be understood, however, that this camper body configuration is shown for illustrative purposes only and the invention is equally applicable to any pop-up camper body whether or not it has a forward extension 20 over the cab.

As is also conventional in camper bodies having pop-up tops, a flexible, foldable fabric side extension is attached to the front, side and rear walls and extends upwardly to a roof 40. The fabric extensions are illustrated as the right side fabric extension 32, left side fabric extension 34, front fabric extension 36, and rear fabric extension 38, although these front, side and rear extensions may be made of a single sheet of fabric formed around the camper body as illustrated, rather than separate fabric sections.

The roof 40 typically includes a plurality of longitudinal frame members 42, extending in spaced-apart relation to each other between front and rear frame header members 44. The top or roof 40 typically includes an outside skin 50 and an inside skin 52 enclosing the roof frame structure to provide a waterproof covering, and an insulation material 54 is sometimes sandwiched between the top and bottom skins 50, 52, as shown in FIG. 3.

Referring now to FIGS. 3 through 6, the bifold lift panel 60 of the present invention is shown positioned at the front of the camper body. This front bifold lift panel 60 is typical of a similar bifold lift panel positioned at the rear of the camper body (not shown). Therefore, the description of this front bifold lift panel 60 will be deemed also to be a description of the bifold lift panel mounted at the rear of the camper body. It is also understood that the bifold lift panels could be mounted on opposite sides of the camper body rather than on the front and rear with equal facility and effectiveness.

The bifold lift panel apparatus 60 of the present invention is comprised of an upper panel section 61 and a lower panel section 62 pivotally attached together with a torsioned hinge 68. The hinge 68 is attached to the bottom edge of the upper panel section 61 and to the upper portion of the lower panel section 62 such that the upper and lower panel sections 61 and 62 are foldable onto each other as shown in FIGS. 5 and 6.

The top edge of the upper panel section 61, is pivotally connected to the front edge of the roof structure by an upper hinge 64 such that the upper section 61 and roof 40 are foldable onto each other.

The bottom edge of the lower panel section 62 is also pivotally attached by lower hinge 72 to the top of the front edge 22 of the forward extension 20 of the camper body. The configuration of the wall is of course discretionary. In this case, the top edge of the wall is illustrated with a returned channel portion 23 on which the lower hinge 72 is fastened.

As best illustrated in FIGS. 4 through 6, the bifold lift panel 60 has its upper and lower panel sections 61, 62 unfolded into substantially vertical position when the top 40 of the camper body is in its raised position for use by occupants. When it is desired to lower or collapse the top 40 for transportation or storage, the bifold lift panel 60 is folded as shown in FIGS. 5 and 6 such that its upper panel section 61 and lower panel section 62 are folded onto each other. Thus folded, as illustrated in FIG. 6, the top 40 is positioned directly over the top edge of the camper body wall 22. Of course, to lift the top 40, the bifold lift panel 60 is unfolded to its open position as shown in FIG. 4 which pushes the top 40 upwardly and supports the top in the expanded position as shown in FIG. 4.

A significant feature of the present invention resides in the torsioned upper, middle and lower hinges 64, 68, 72 in the bifold panel 60 which bias the bifold panel 60 to its expanded or unfolded position tending to push the camper top 40 upwardly to its use position. The hinges connect the respective sections of the panel together, to the camper body on the front or rear wall, and to the top or roof of the camper at its front and rear edges.

As best seen in FIGS. 7 through 9, the upper hinge 64 is illustrated in detail and is also representative of the middle and lower springs 68, 72. The hinge 64 is comprised of two elongated plates 65, 66 pivotally mounted on an elongated shaft 67 in the conventional manner of backflap hinges. A plurality of small, coiled torsion springs 80 are mounted in spaced-apart intervals on the shaft 67 with one end of the spring 81 extending radially and outwardly into contact with the first plate 65 and the other end 83 of the spring 80 extending radially outwardly in the opposite direction into contact with the other plate 66.

The bias of the coiled portion 82 of spring 80 acts simultaneously through its ends 81, 83 onto the respective plates, 65, 66 tending to force the hinge 64 to a full open position as shown in FIG. 8. However, depending on the mounting of the respective hinges, the panel sections will not be allowed to open to that extent. For example, the middle hinge 68 is open to the position shown in FIG. 8 with the plates approximately 180° from each other. FIGS. 4, 5 and 6 also illustrate the respective positions of the hinges at various stages of folding throughout the range of operation of the bifold lift panel of the present invention.

Of course, the strength and number of springs 80 in each hinge determine the total bias force in the bifold panel lift apparatus 60, and these parameters can be varied according to the desires of a particular manufacturer or user. It has been found most advantageous to have a sufficient number of springs 80 with each having sufficient strength to produce a total bias force sufficient either to lift the top 40 with no additional assistance from the user required, or to have sufficient bias force to raise the top 40 with only a minimal additional assistance from the user required. The lower lift panel 62 has an upward extension 63 which extends upwardly beyond the middle hinge 68 that when the bifold panel 60 is in its fully unfolded position as shown in FIGS. 3 and 4, the upper end 63 is adapted to bear against the midportion of the upper panel section 61 to limit the extent of unfolding caused by the bias of the hinges to that shown in FIGS. 3 and 4. Also, when collapsing the top, the upper end 63 of lower panel section 62 can be used as a handle to pull the bifold lift panel apparatus 60 into the folded position against the bias of the torsioned hinges.

As mentioned above, the flexible fabric wall extension is attached to the peripheral edges of the roof and to the top edges of the solid walls of the camper body. For example, the front flexible fabric wall extension 36 is attached to the front edge of the roof 40 on the top and at the bottom to the top edge of front panel extension 22 outside the bifold lift panel apparatus 60 and adjacent thereto. The flexible fabric extension 36 is tied at its midsection to the middle hinge 68 by a fabric strap 37 so that as the bifold lift panel apparatus is folded to lower the roof 40, the flexible fabric extension 36 is drawn into an unwrinkled, folded position parallel to the upper and lower panel sections, 61, 62 of the bifold lift apparatus 60. An overhanging front molding 78 on the front edge of the roof 40 fits over a rounded molding 76 on the front panel 22 when the roof is in the collapsed position to seal the mechanism against moisture and other weather elements as shown in FIG. 6.

As mentioned above, a similar bifold panel lifting and folding apparatus is provided at the back of the camper body, and the back flexible fabric extension 38 is similarly tied to the rear lift panel lift apparatus to assure neat, unwrinkled folding as the roof 40 is collapsed. However, since there are no bifold lifting and folding apparatus on the sides of the camper body, other means are required to maintain the flexible fabric side panel extensions 32, 34 in a neat, unwrinkled folding configuration as the top 40 is raised and lowered.

The guide stays 100 are therefore another significant feature of the present invention as best seen in FIGS. 10 through 12, the guide stay 100 of the present invention is an elongated, rigid, but resilient strap, preferably fabricated of nylon or a material with similar characteristics. The guide stay 100 is attached at the top to the edge of the roof 40 and at the bottom to the top edge of the side wall of the camper body 26. It is precrimped or form-molded with a sharp bend at its midsection as indicated at 102 causing it to have an inherent prefold bias, even when the top 40 is in its raised or extended position. Then, as the top 40 is collapsed to its nonuse or storage position, the guide stay 100 folds the fabric 34 in a neat and unwrinkled configuration as shown in FIG. 12.

The upper end 104 of the guide stay 100 is attached to the edge of the roof 40 by a screw 133 which also holds the edge molding 112 in position. The bottom end 106 is similarly attached to the top of wall panel 26 by screw 111 which holds a molding 110 in position. An insulation strip 116 is typically positioned between the fabric 34 and the wall panel 26. When the roof is completely collapsed, the downwardly extending molding or flashing 112 is positioned over the molding 110 to seal against water and other weather elements.

Although not shown in the drawings, it is also advantageous to provide a flexible fabric wall comprised of two sheets of fabric 34 adjacent each other with the guide stay 100 positioned between the two sheets of fabric. When positioned in this manner, the guides stays are not visible on the outside or inside of the camper, and they are protected from snagging objects such as tree branches and the like when the camper is moved with its top up in the expanded position.

The bifold lifting and folding apparatus 60 of the present invention is particularly advantageous for raising and lowering camper tops. When the bifold panel is of sufficient length to span the entire width of the camper body and with hinges 64, 68, 72 also span virtually the entire width of the camper body, it provides a very strong support structure for the roof 40 which always maintains the roof 40 in proper alignment above the camper body and strongly resists side loading on the roof which would otherwise tend to push the roof to one side of the camper body. As the roof 40 is collapsed to its folded position, the bifold panels always lower it in perfect alignment with the top edges of the wall panels of the camper body.

The torsioned hinges in the bifold lift panel 60 also allow the user simply to unfasten the top from the sides and the lift panel 60 automatically pushes the top 40 to its extended position, again in perfect alignment and with great stability to its proper position for use. The particular torsioned hinges disclosed herein are advantageous in facilitating a wide range of biased strengths by merely varying the number or strength of the springs in each hinge, and they are compact, neat and all self-contained within the camper body, and they do not protrude where they can be caught and torn off by passing tree limbs or branches or other obstacles as the vehicle is being driven. Yet, they also do not protrude into the interior space of the camper when the roof is raised into use position thereby eliminating any interference with the full use of the space within the camper body by the occupants.

The guide stays 100 further enhance the compactness of the lifting and folding apparatus of the present invention by also taking up no space on the interior of the camper body and not protruding on the exterior of the camper body either. Further, they operate automatically as the camper roof 40 is raised and lowered to neatly fold the fabric wall extensions without requiring any further or cumbersome manual manipulation to ensure that the fabric wall extensions are folded neatly to keep them from getting caught between adjacent edges of the roof and wall sections when folded to prevent tears or holes wearing into the fabric from rubbing during transportation.

Although the present invention has been described with a certain degree of particularity, it is understood that the present disclosure has been made by way of example and that changes in details of structure may be made without departing from the spirit thereof. It is also contemplated that this invention has utility in simlar uses not involving camper bodies even though the description provided herein has been illustrated only with camper bodies.

What is claimed is:

1. Camper top lift and folding apparatus for raising, supporting and lowering a roof and flexible extensions of a camper body, comprising:

a bifold panel having a substantially planar upper panel section and a substantially planar lower section, said upper panel section and said lower panel section being approximately equal to each other in width, but said lower panel section having a height dimension greater than the height dimension of said upper panel section, and said upper and lower panel sections being positioned in overlapping relation to each other with the bottom edge of said upper panel section positioned adjacent to and pivotally connected to the midportion of said lower panel section along a line on said lower panel section spaced a distance upwardly from the bottom edge of said lower panel section equal to the height dimension of said upper panel section in a manner such that the upper portion of said lower panel section extends upwardly beyond said line in overlapping relation with at least the lower portion of said upper panel section and adapted to abut against the midportion of said upper panel section and limit to substantially vertical positions the extent to which said upper and lower panel sections can pivot away from each other;

a middle torsion biased hinge attached to the bottom dge of said upper panel section and to the midportion of said lower panel section on said line for pivotally connecting said upper and lower sections together such that they are foldable together with each other about said middle hinge;

an upper torsion biased hinge attached to the top edge of said upper section and to said roof for pivotally connecting said roof to said upper section; and a lower torsion biased hinge attached to the bottom edge of said lower section and to said rigid wall of the camper body, each of said hinges having a pair of plates pivotally mounted on a common shaft and a coiled torsion spring also mounted on said shaft with one end contacting the other plate tending to bias the hinge to open position.

2. In a camper body with an expandable top with a flexible, foldable wall portion extending between a solid wall portion and a roof of the camper body, the improvement comprising:

an elongated stiff and resilient member having an inherent crimp at its midsection for resisting total straightening of the member and adapted to bias the member to bend in the direction of the crimp when compression forces are applied to the opposite ends of said member tending to push said opposite ends together, said member being positioned to extend between said solid wall portion and said roof with said crimped midsection in contact with said flexible wall portion and oriented with the crimp and biased bend directed inwardly toward the interior of the camper body and adapted to fold said flexible wall portion inwardly when said roof portion is lowered toward said solid wall portion.

* * * * *

UNITED STATES PATENT AND TRADEMARK OFFICE
CERTIFICATE OF CORRECTION

PATENT NO. : 4,201,413
DATED : May 6, 1980
INVENTOR(S) : Rowe, David E.

It is certified that error appears in the above—identified patent and that said Letters Patent is hereby corrected as shown below:

Column 5, line 62, "screw 133" should read --screw 113--.

Column 7, line 25, "dge" should read --edge--.

Add the following claim:

3. The camper top lift and folding apparatus of claim 1, including two bifold panels, one of said panels being positioned at the front of the camper body and attached at the top to the front edge of the roof and attached at the bottom to the top edge of the front rigid wall of the camper body such that said one bifold panel folds inwardly as the top is lowered, and the other of said panels being positioned at the back of the camper body and attached at the top to the roof and attached at the bottom to the top edge of the rear rigid wall of the camper body.

UNITED STATES PATENT AND TRADEMARK OFFICE
CERTIFICATE OF CORRECTION

PATENT NO. : 4,201,413
DATED : May 6, 1980
INVENTOR(S) : Rowe, David E.

It is certified that error appears in the above—identified patent and that said Letters Patent is hereby corrected as shown below:

On the title page, immediately following the Abstract, "2 claims" should read -- 3 claims --.

Signed and Sealed this

Ninth Day of December 1980

[SEAL]

Attest:

SIDNEY A. DIAMOND

Attesting Officer

Commissioner of Patents and Trademarks